Figure 1:
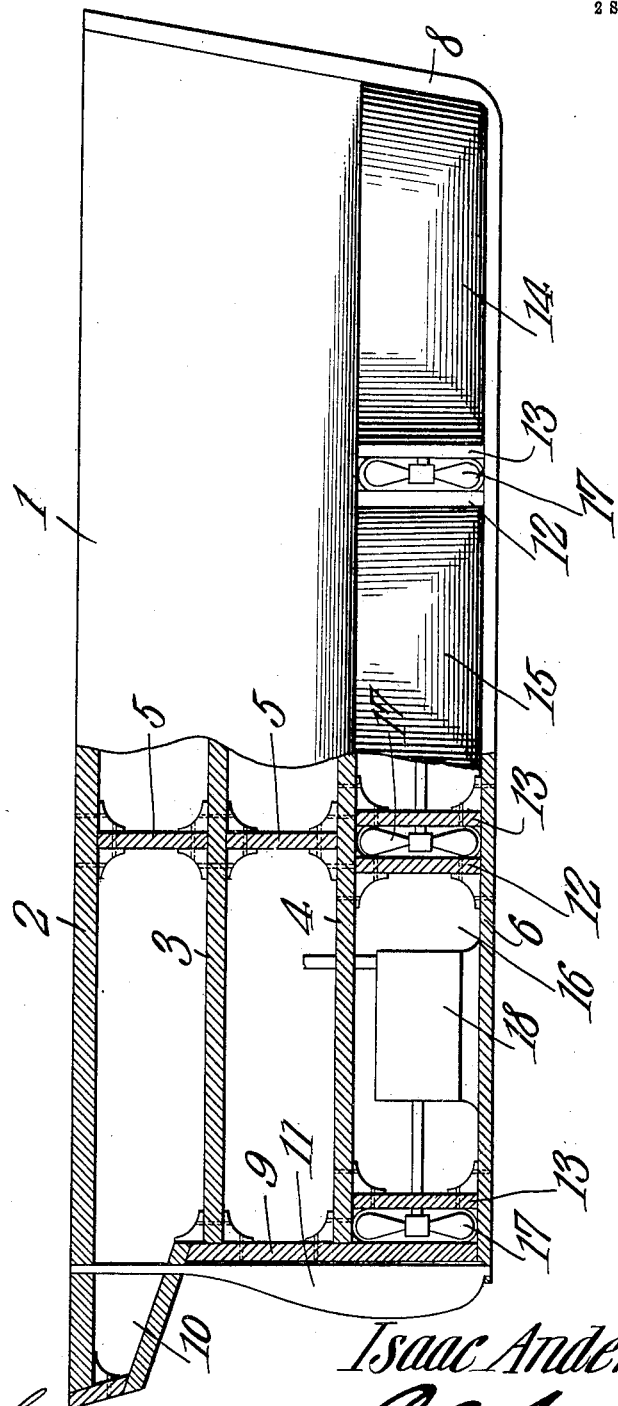

I. ANDERSON.
BOAT.
APPLICATION FILED JAN. 20, 1908.

913,868.

Patented Mar. 2, 1909.
2 SHEETS—SHEET 1.

Witnesses

Inventor
Isaac Anderson.
By
Attorneys

I. ANDERSON.
BOAT.
APPLICATION FILED JAN. 20, 1908.

913,868.

Patented Mar. 2, 1909.
2 SHEETS—SHEET 2.

Isaac Anderson, INVENTOR

UNITED STATES PATENT OFFICE.

ISAAC ANDERSON, OF PUYALLUP, WASHINGTON, ASSIGNOR OF ONE-HALF TO NILS PEARSON, OF PUYALLUP, WASHINGTON.

BOAT.

No. 913,868.   Specification of Letters Patent.   Patented March 2, 1909.

Application filed January 20, 1908. Serial No. 411,779.

*To all whom it may concern:*

Be it known that I, ISAAC ANDERSON, a citizen of the United States, residing at Puyallup, in the county of Pierce and State of Washington, have invented a new and useful Boat, of which the following is a specification.

This invention relates to improvements in boats, and its object is to provide a means whereby the extent of displacement of water by the hull of the boat in traveling through the water is materially reduced, and the resistance to the passage of the boat through the water is correspondingly reduced so that with a given power the speed of the boat may be increased far beyond that of boats as ordinarily built.

In accordance with the present invention the hull of the boat may be made similar to that of ordinary steam-propelled boats, while the keel portion is continued below the hull and is there formed into a number of longitudinally-disposed compartments each narrowing both forward and rearward from a central portion with the narrow portions of two consecutive compartments contiguous with a space provided for the housing of a propeller. Each compartment is designed to contain a suitable engine coupled to the propeller shaft and there will be as many propellers as there are compartments. By this means a longitudinal series of propellers, one at the stern of the boat and others positioned toward the bow, say, equal distances apart, may be employed. The compartments for the engines are made of very materially less width than the width of the body of the boat, but may be of sufficient size to not only sustain the weight of the engines but aid in upholding the hull of the boat so that the water line is comparatively far down on the hull of the boat and the latter floats well toward the surface of the water. This means that the displacement of the water as the boat moves through the same is greatly reduced since that portion of the boat containing the engines and constituting a sub-structure below the main hull is much narrower than in boats as ordinarily constructed. Furthermore, the sub-structure may be so shaped that the water will find its way toward the propellers and so keep the same constantly supplied with water as the boat moves through the water. Furthermore, there is no danger of the propellers being lifted out of the water while the boat is subjected to the action of heavy seas, and consequently there can be no racing of the propellers and the engines driving the same, as is often the case when boats as ordinarily constructed with the propeller at the stern, are lifted by the seas through which the boat may pass.

The invention will be best understood from a consideration of the following detail description taken in connection with the accompanying drawings forming a part of this specification, in which drawings,—

Figure 2:
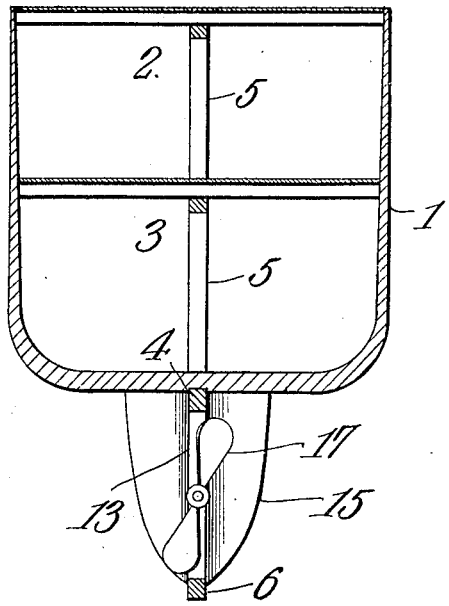
Figure 3:
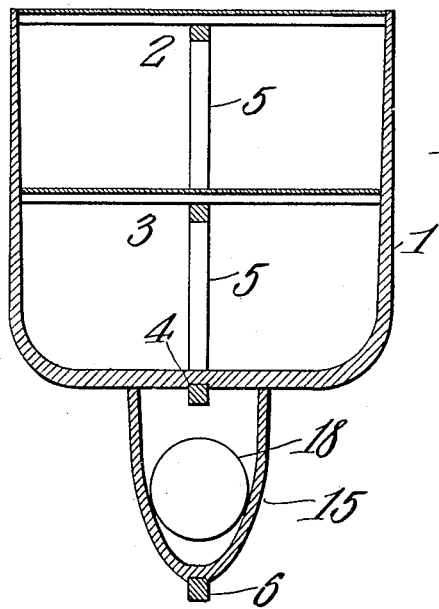

Figure 1 is a side elevation of the improved boat with parts in section. Fig. 2 is a vertical cross section on a line coincident with one of the propellers, and Fig. 3 is a vertical cross section on a line about midway of one of the engine rooms.

Referring to the drawings, there is shown a boat hull 1 which, generally considered, may be of ordinary construction, but for purposes of strength and stiffness I prefer to form the hull with central longitudinal beams 2, 3 and 4 when the hull is made with two decks, as shown. If more decks be employed then each deck will be provided with a longitudinal beam. The beam 4 may correspond to the keel of the body of the boat, and posts 5 are employed to support the beams 2 and 3 upon said beam 4. The structure of the main body of the boat, aside from the longitudinal beams 2, 3, 4, and supporting posts 5, may agree with the best practice in boat building, and so it is unnecessary to deal particularly in this description with the details of the structure of the hull.

At an appropriate distance below the beam 4 is a keel 6 connected to the beam 4 by appropriately spaced posts and this keel 6, together with the beam 4 and beams 2 and 3 are all connected to the stem post 8. The beams 3 and 4 and the keel 6 can also be connected to the stern post 9, and the latter may terminate at its upper end in the usual stern overhang 10.

At appropriate points there are arranged pairs of posts 12, 13, spaced apart and extending from the beam 4 to the keel 6, and these posts are of course appropriately braced. Between the stem 8 and the first-post 13 there is formed a compartment 14, the side walls of which start at the stem post 8 and gradually swell to a point midway between the post 8 and the corresponding post 13 and then gradually narrow until they merge finally into the post 13. Between the first post 12 and the next post 13 to the rear is formed another like compartment 15, and between the next post 12 and the last post 13 to the rear is formed still another compartment 16. The last post 13 at the rear is spaced a distance from the stern post 9 similar to the distance of the other posts 12 and 13. The spaces between the posts 12 and 13 and between the last post 13 and the stern post 9, is sufficient to contain a propeller 17, there being such a propeller for each compartment 14, 15 and 16. Within each compartment is located an engine 18, which in the drawings is indicated merely as a rotary engine, and the indication may be taken as representative of a turbine engine or a rotary steam engine or a reciprocating steam engine, as may be found to be desirable in practice.

It is to be observed that the greatest width of the compartment 14, 15 and 16, which may be alike, is much less than the width of the hull of the boat, and these compartments are appropriately shaped to present the least possible resistance of the passage of the boat in the water while at the same time their capacity is sufficient to receive the engines and to have a buoyant effect sufficient to overcome the weight of the engines, thus relieving the main hull from such weight.

By locating the propellers in the sub-structure below the main body of the boat and by employing a number of such propellers each driven by an independent engine, and by making the sub-structure much narrower than the main body of the boat but of sufficient size to contain the engines and add to the buoyancy of the boat, the wider body is sustained more nearly on the surface of the water than is the case with ordinary boat structures where usually the engines are carried in the main hull and so the boat in traveling through the water must displace a large body of water laterally. By suitably curving the walls of the compartments 14, 15 and 16, from the front or forward end toward the middle or widest portion and then approach the rear end of each compartment by an easy curve, such water as is displaced by these compartments is gradually moved laterally and then quickly falls back again toward the propellers and so these latter are each fed by an abundant body of water finding easy access thereto and consequently the thrust of the propeller is promptly resisted by a material body of water and the efficiency of the propeller is thus maintained. This is true of each propeller, and consequently the propeller acts on the boat to drive it through the water and the speed of the boat is therefore increased over and above what would be possible with a single propeller or with a number of propellers grouped at the stern of the boat.

If the boat be subjected to the action of waves there is not so much danger of lifting the rear propeller from the water and so causing its engine to race, as is the case with boats where the propeller shaft is above the bottom of the main hull, and the other propeller shafts can of course never be lifted above the water.

Because of the buoyant action of the sub-structure containing the engines and propellers, the main hull will rest higher in the water than is the case with ordinary hulls and the danger of lifting the rear propeller above the water when the boat is in a heavy sea is correspondingly reduced. Furthermore, the placing of the heavy parts of the boat in the sub-structure serves to better balance the boat than when these parts are higher in the hull and the boat will likewise be steadier in heavy seas than is the case with boats of ordinary construction.

What is claimed is:—

1. A boat comprising a main body or hull, having longitudinal beams in the central longitudinal vertical plane of the boat, and joined together by upright posts, a keel below the main body of the boat and connected thereto, and spaced therefrom by upright posts spaced one from another in the longitudinal sectional plane of the boat, and compartments between the keel and bottom of the main body of the boat each wide at the middle portion and narrowing until it joins at each end the spaced posts connecting the keel to the main body or hull of the boat, a stem post connecting the front ends of all the longitudinal beams and also the keel, and a stern post connecting the keel and such of the longitudinal beams as are not extended into the stern overhang.

2. A boat comprising a main body or hull having longitudinal beams in the central longitudinal vertical plane of the boat, and joined together by upright posts, the lowermost beam being coextensive with the length of the bottom of the main hull of the boat, a keel below the main body or hull of the boat and connected thereto and spaced therefrom by upright posts spaced one from another in the longitudinal sectional plane of the boat, compartments between the keel and bottom of the main body of the boat, each wide at the middle portion and narrowing until it joins at each end the spaced posts connecting the keel to the main body or hull of the boat, a stem post connecting the front ends of all the longitudinal beams and also the keel, and a stern post connecting the keel and such of the longitudinal beams as are not extended into the stern overhang, propellers mounted between the spaced upright posts and also adjacent to the stern post, and engines housed in the compartments between the lowermost of the longitudinal beams and the keel.

In testimony that I claim the foregoing as my own, I have hereto affixed my signature in the presence of two witnesses.

ISAAC ANDERSON.

Witnesses:
ROBERT WILSON,
J. P. LEAVITT.